(12) United States Patent
Brown et al.

(10) Patent No.: US 11,904,919 B2
(45) Date of Patent: Feb. 20, 2024

(54) APPARATUS AND METHOD FOR ASSISTING IN DECOUPLING A WHEELS-ON-GROUND DAUGHTER CART FROM A MOTHER CART

(71) Applicants: Edmund W. Brown, Racine, WI (US); Eric Wayne Brown, Racine, WI (US); Ryan Edmund Brown, Racine, WI (US)

(72) Inventors: Edmund W. Brown, Racine, WI (US); Eric Wayne Brown, Racine, WI (US); Ryan Edmund Brown, Racine, WI (US)

( * ) Notice: Subject to any disclaimer, the term of this patent is extended or adjusted under 35 U.S.C. 154(b) by 232 days.

(21) Appl. No.: 17/224,010

(22) Filed: Apr. 6, 2021

(65) Prior Publication Data

US 2022/0315082 A1    Oct. 6, 2022

(51) Int. Cl.
*B62B 3/02* (2006.01)
*B62B 3/14* (2006.01)

(52) U.S. Cl.
CPC .............. *B62B 3/02* (2013.01); *B62B 3/1476* (2013.01); *B62B 2207/02* (2013.01)

(58) Field of Classification Search
CPC ..... B62B 3/02; B62B 3/1476; B62B 2207/02; B62B 5/0079; B62B 3/04; B62D 53/005
See application file for complete search history.

(56) References Cited

U.S. PATENT DOCUMENTS 2,813,727 A    11/1957 Whalen
2,903,219 A    9/1959 Ingham
(Continued)

FOREIGN PATENT DOCUMENTS

CA    3012219 A1 *    1/2020    .............. B62B 3/18
CN    108725530 A *    11/2018
(Continued)

OTHER PUBLICATIONS

YouTube video "Topper Industrial Patented Low Profile Design Added to Wheels on the Ground Mother Daughter Carts"; website—https://youtu.be/pTyuTTYN7KU; dated Mar. 12, 2020, as accessed Jul. 14, 2021, showing a mother cart and a daughter cart as displayed and operated at the MODEX Trade Show in Atlanta, GA, USA, Mar. 12-19, 2020.

*Primary Examiner* — James A Shriver, II
*Assistant Examiner* — Ian Bryce Shelton
(74) *Attorney, Agent, or Firm* — Boyle Fredrickson, S.C.

(57) ABSTRACT

A method and apparatus for assisting in removing a wheels-on-ground type daughter cart from a mother cart, and a mother cart incorporating such a method and apparatus, utilize a daughter cart ejector apparatus mounted on a mother cart and having a selectively actuatable ejector element for urging the daughter cart to move out of engagement with the mother cart in an unloading direction. The ejector element is configured and operatively connected to bear against the daughter cart and apply force in a manner that assists in initiating movement of the daughter cart in the unloading direction and reorienting casters supporting the daughter cart on an underlying surface from a rolling orientation that is generally parallel to a transport direction of the mother cart, to a rolling orientation that is generally transverse to the transport direction and parallel to the unloading direction.

17 Claims, 8 Drawing Sheets

(56) References Cited

U.S. PATENT DOCUMENTS

| | | |
|---|---|---|
| 3,207,253 A | 9/1965 | Branning |
| 4,037,678 A | 7/1977 | Braune |
| 4,515,518 A | 5/1985 | Gilbert et al. |
| 4,947,955 A | 8/1990 | Hopely |
| 6,010,194 A | 1/2000 | Cykon |
| 7,213,819 B2 | 5/2007 | Carbonero |
| 8,302,975 B2 | 11/2012 | Hergeth |
| 8,540,255 B2 | 9/2013 | Young |
| 9,211,900 B2 | 12/2015 | Knepp |
| 9,227,645 B2 | 1/2016 | Franco |
| 9,862,435 B2 | 1/2018 | Scarth et al. |
| 10,093,334 B1 * | 10/2018 | Brown .................. B62B 3/005 |
| 2010/0066045 A1 | 3/2010 | Presnell et al. |
| 2010/0109268 A1 | 5/2010 | Koehler et al. |
| 2014/0008892 A1 | 1/2014 | Holtan et al. |
| 2015/0225007 A1 * | 8/2015 | Knepp .................. B62D 63/06 280/47.18 |
| 2015/0344086 A1 | 12/2015 | Scarth et al. |
| 2017/0088156 A1 * | 3/2017 | Ard ........................ B62B 5/00 |
| 2019/0270472 A1 * | 9/2019 | Akamatsu ............. B62B 5/0079 |
| 2020/0001907 A1 * | 1/2020 | Scarth .................. B62D 53/005 |
| 2021/0276603 A1 * | 9/2021 | Knepp .................... B62B 5/04 |
| 2021/0276806 A1 * | 9/2021 | Knepp ................ B62D 53/005 |
| 2022/0219746 A1 * | 7/2022 | Amemiya ................ B60D 1/02 |

FOREIGN PATENT DOCUMENTS

| | | | | |
|---|---|---|---|---|
| CN | 110435729 A | * | 11/2019 | |
| DE | 102008035914 A1 | * | 2/2010 | ............... B62B 3/04 |
| DE | 102013008242 A1 | * | 11/2014 | ............... B60P 1/020 |
| EP | 1352815 A1 | * | 10/2003 | ............... B60D 1/00 |
| EP | 2161182 A2 | * | 3/2010 | ........... B62D 53/005 |
| EP | 2487067 A2 | * | 8/2012 | ............ B60P 1/4414 |
| EP | 2808234 A1 | * | 12/2014 | ............. B62B 3/06 |
| EP | 2910416 B1 | * | 7/2019 | ................ B60P 1/02 |
| WO | WO-2013021329 A1 | * | 2/2013 | ................ B62B 3/02 |

\* cited by examiner

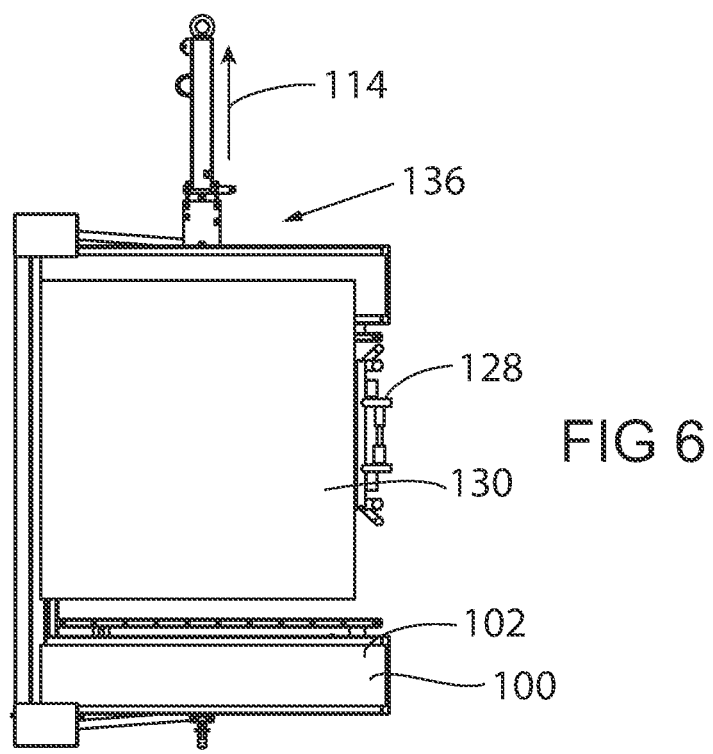

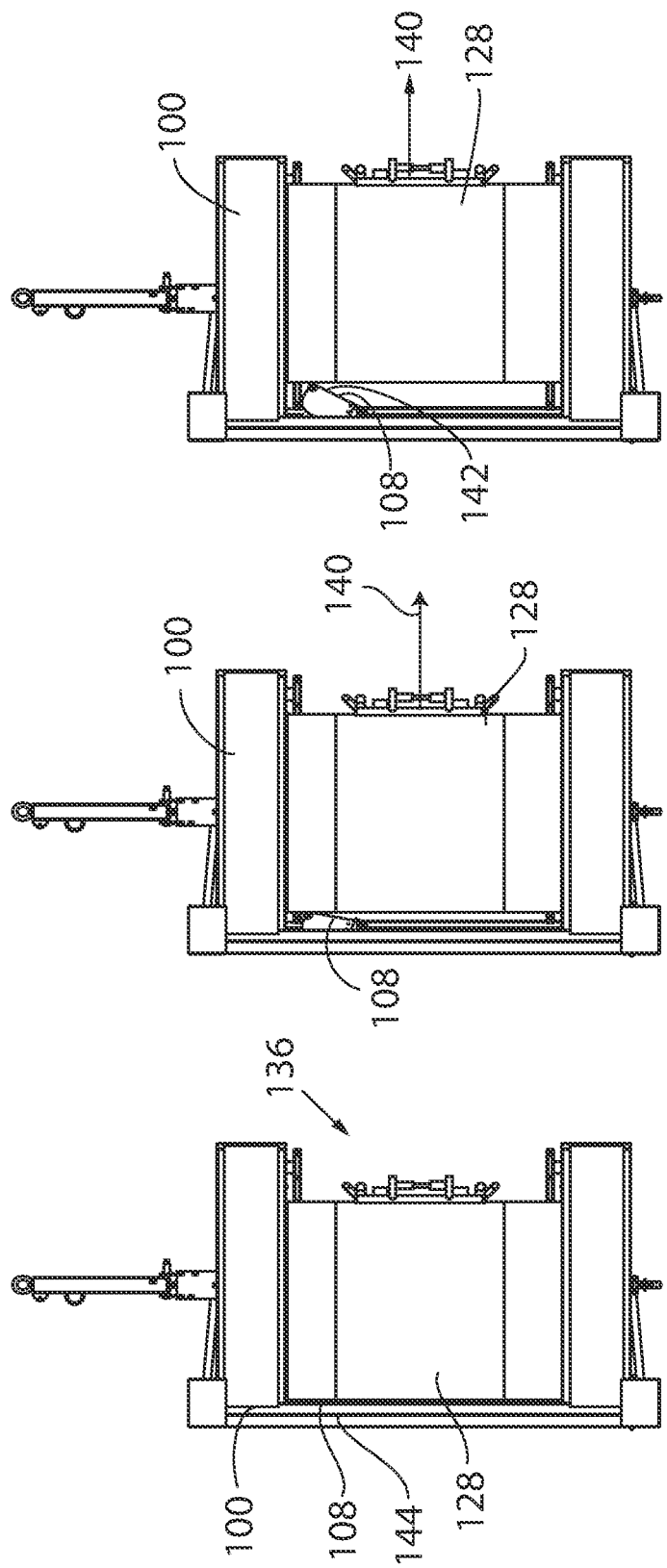

APPARATUS AND METHOD FOR ASSISTING IN DECOUPLING A WHEELS-ON-GROUND DAUGHTER CART FROM A MOTHER CART

FIELD OF THE INVENTION

This invention generally relates to industrial mother/daughter cart arrangements, and more particularly to an apparatus and method for coupling one or more wheels-on-ground type daughter carts to a mother cart in a manner that provides ejection assistance during decoupling of the daughter cart(s) from the mother cart.

BACKGROUND OF THE INVENTION

Modern manufacturing processes require that parts be delivered to work or assembly stations and stored there in a manner that facilitates operations at those stations. In the past, such deliveries of parts were often carried out by transporting parts in bins or carts, carried to the work or assembly stations by fork-lift trucks. For a variety of reasons, including improvements in efficiency and safety, manufacturing facilities are increasingly moving toward so-called "fork-free" operations, in which the delivery of parts by fork-lift trucks has largely been supplanted by mother/daughter cart arrangements pulled by manned or autonomous tugs.

A mother/daughter cart arrangement is an industrial cart system consisting of one large mother cart and one or more, smaller daughter carts. The daughter carts are designed to fit within the mother cart. Once inside, the daughter carts are locked into the mother cart. The mother cart and daughter carts are then towable together as one. Mother and daughter carts are often highly customized for optimal performance in a particular aspect of a manufacturer's operation.

The manner in which the mother and daughter carts are locked together has a major impact on the effectiveness and efficiency of the mother/daughter cart system. It is desirable that such a locking system be simple to operate, rugged in nature, and adaptable to a wide range of different types of mother and daughter carts. It is also desirable to provide an apparatus and method for coupling one or more daughter carts to a mother cart in a manner that does not require the additional complication of having to lift the daughter carts off of the underlying surface during transport. This is particularly the case where the loaded daughter carts are heavy, in some cases weighing more than one thousand pounds. In such cases it is highly desirable to leave the load supported on the wheels of the daughter cart during transport by the mother cart.

Having the heavy load of the daughter cart remain supported by the daughter cart wheels during transport can present challenges, however, during separation of the daughter cart from the mother cart at the delivery site. Typically, daughter carts utilize wheels in the form of rotatable caster arrangements that allow them to be readily maneuvered into a desired position. During transport by the mother cart, the eccentric mounting of the wheels in the casters will cause the wheels to swivel into an orientation that allows them to roll freely in a direction that is generally parallel the direction of travel of the tow vehicle and mother cart. This orientation of the wheels during transport, however, is perpendicular to the direction that the wheels in the casters need to be oriented for the daughter cart to be rolled into or out of engagement with the mother cart. In order for the daughter cart to be rolled out of engagement with the mother cart, the casters must swivel essentially ninety degrees to realign the wheels of the daughter cart from their transport position. When the daughter cart and its load are heavy, and particularly while the daughter cart is still partly constrained within a coupling system used to join the daughter cart to the mother cart during transport, a large additional force initially needs to be exerted on the daughter cart in a direction perpendicular to the direction of travel of the mother cart to get the daughter cart caster wheels to begin swiveling from their transport orientation to their unloading orientation, above and beyond the force that is otherwise required to get the heavy daughter cart moving in the unloading direction and rolled out of engagement with the mother cart.

It is desirable, therefore, to provide an apparatus and method for assisting in separating a wheels-on-ground daughter cart from a mother cart. It is also desirable that such an apparatus and method provide for such assistance in a manner that is incorporated into a mother/daughter industrial cart coupling arrangement. It is further desirable that some forms of such an apparatus and method include interlocking and on-board control arrangements for securing the daughter cart into the mother cart and controlling operation of the separation assisting apparatus.

SUMMARY OF THE INVENTION

The invention provides a method and apparatus for assisting in removing a wheels-on-ground type daughter cart from a mother cart, and a mother cart incorporating such a method and apparatus. The invention utilizes a daughter cart ejector apparatus mounted on a mother cart and having a selectively actuatable ejector element for urging the daughter cart to move out of engagement with the mother cart in an unloading direction. The ejector element is configured and operatively connected to bear against the daughter cart and apply force in a manner that assists in initiating movement of the daughter cart in the unloading direction and in reorienting casters supporting the daughter cart on an underlying surface from a rolling orientation that is generally parallel to a transport direction of the mother cart, to a rolling orientation that is generally transverse to the transport direction and parallel to the unloading direction. As a result, the amount of force that an operator must initially exert to move the daughter cart out of engagement with the mother cart is reduced.

In one form of the invention, a mother cart adapted for receiving, transporting, and ejecting, a daughter cart of the wheels-on ground-type, where the daughter cart has a daughter cart frame supported by casters attached to the daughter cart frame and configured for rolling engagement with an underlying surface during transport of the daughter cart on the underlying surface, includes a mother cart frame, a coupling system and a daughter cart ejector apparatus attached to the mother cart for aiding the separation of the daughter cart from a mother cart. The mother cart frame defines a transport direction and is supported by wheels attached to the mother cart frame for rolling engagement with the underlying surface. The coupling system is attached to the mother cart frame, and is adapted and oriented for operatively guiding the daughter cart in a loading direction that is substantially transverse to the transport direction into towable engagement in a towing position with the mother cart.

The daughter cart ejector apparatus has an ejector element operatively attached to the mother cart frame and configured for movement between an extended position of the ejector element where the ejector element operatively bears against the daughter cart frame in a manner urging the daughter cart to move away from the mother cart in an unloading direction that is substantially opposite from the loading direction, and a retracted position of the ejector element where the ejector element does not urge the daughter cart to move away from the mother cart in the coupling system in the unloading direction.

Some forms of the invention may also include an ejector element actuator and a control arrangement. The ejector element actuator may be operatively connected between the mother cart frame and the ejector element, with the ejector element actuator being configured for selectively moving the ejector element between the retracted and extended positions of the ejector element. The control arrangement may be operatively attached to the mother cart and the ejector element actuator. The control arrangement may include a daughter cart initiate-eject input element configured for receiving an initiate-eject input indicating a desire to initiate ejection of the daughter cart from the mother cart, with the control arrangement being configured for generating a commence-eject signal to the ejector actuator in response to the initiate-eject signal, for moving the ejector element from the retracted toward the extended positions of the ejector element.

In some forms of the invention, the ejector element may be an ejector arm having a proximal end pivotably attached to the mother cart frame at a pivot point defined by the mother cart frame, and a distal end adapted for bearing against a daughter cart engaged with the coupling system of the mother cart and disposed in the towing position, and the ejector actuator may be a linear electric actuator operatively connected between the mother cart frame and the ejector arm for pivoting the ejector arm about the pivot point, such that in the extended position of the ejector arm the distal end of the ejector arm is brought to bear against and urge the daughter cart to move in the coupling system away from the towing position in the unloading direction.

In some forms of the invention, the coupling system may further include a locking pin arrangement operatively attached to the mother cart and including a locking pin and a locking pin position selector. The locking pin may be selectively movable between a fully engaged position and a fully disengaged position and adapted for engaging and locking the daughter cart in the towing position when in the fully engaged position of the locking pin while the daughter cart is positioned in the towing position. The locking pin position selector may be operatively connected within the locking pin arrangement to the locking pin and be configured to be selectively movable between pin-engaged and pin-disengaged positions of the selector, for positioning the locking pin in its fully engaged position when the locking pin position selector is located in its pin-engaged position, and for positioning the locking pin in its fully disengaged position when the locking pin position selector is located in its pin-disengaged position. In addition, the control arrangement may be further configured for determining that the locking pin has been fully disengaged from the daughter cart and for delaying communication of the commence-eject signal to the ejector element actuator, and thereby precluding the ejector element from commencing movement from its retracted toward its extended positions, until full disengagement of the locking pin from the daughter cart has been detected.

A control arrangement, according to the invention, may include a controller and a locking pin position sensor. The locking pin position sensor may be operatively coupled between the locking pin and the controller and configured for providing a locking pin position signal to the controller indicative of a present position of the locking pin. The controller may be configured for receiving the initiate-eject input, the locking pin position signal, and for generating the commence-eject signal, and may be operatively connected between the locking pin position sensor and the ejector element actuator. The controller may be configured for receiving the locking pin position signal from the locking pin position sensor, determining if the locking pin is fully disengaged, and then further configured such that, if and only if the locking pin is fully disengaged the controller will generate and send the commence-eject signal to the ejector element actuator.

A controller, according to the invention, may be further configured for determining that the locking pin has been held in its fully disengaged position for a pre-selected period of time before sending the commence ejection signal to the ejector element actuator.

In some forms of the invention, the locking pin arrangement and control arrangement may be configured such that the locking pin position selector is the initiate-eject input element.

The invention may also take the form of a daughter cart ejector apparatus adapted for attachment to a mother cart that is configured for receiving, transporting, and ejecting, a daughter cart of the wheels-on ground-type, for aiding in separation of the daughter cart from a mother cart, where the daughter cart has a daughter cart frame supported by casters attached to the daughter cart frame and configured for rolling engagement with an underlying surface during transport of the daughter cart on the underlying surface. Such a daughter cart ejector apparatus, according to the invention, would be adapted for use with a mother cart that is adapted for receiving the daughter cart ejector apparatus, and has a mother cart frame defining a transport direction, with the mother cart frame being supported by wheels attached to the mother cart frame for rolling engagement with the underlying surface and including a coupling system attached to the mother cart frame, where the coupling system is adapted and oriented for operatively guiding the daughter cart in a loading direction that is substantially transverse to the transport direction into towable engagement in a towing position with the mother cart.

Such a daughter cart ejector apparatus, according to the invention, may include an ejector element, an ejector element actuator, and a control arrangement.

The ejector element may be adapted for operative attachment to the mother cart frame and configured for movement between an extended position of the ejector element where the ejector element operatively bears against the daughter cart frame in a manner urging the daughter cart to move away from the mother cart in an unloading direction that is substantially opposite from the loading direction, and a retracted position of the ejector element where the ejector element does not urge the daughter cart to move away from the mother cart in the coupling system in the unloading direction.

The ejector element actuator may be adapted for operative connection between the mother cart frame and the ejector element and be configured for selectively moving the ejector element between the retracted and extended positions of the ejector element.

The control arrangement may be adapted for operative attachment to the mother cart and the ejector element actuator. The control arrangement may include a daughter cart initiate-eject input element configured for receiving an initiate-eject input indicating a desire to initiate ejection of the daughter cart from the mother cart. The control arrangement may also be configured for generating a commence-eject signal to the ejector actuator in response to the initiate-eject signal, for moving the ejector element from the retracted toward the extended positions of the ejector element.

In some forms of a daughter cart ejector apparatus, according to the invention, the ejector element may be an ejector arm having a proximal end adapted for pivotable attachment to the mother cart frame at a pivot point defined by the mother cart frame, and a distal end adapted for bearing against a daughter cart engaged with the coupling system of the mother cart and disposed in the towing position.

The ejector actuator, in some forms of a daughter cart ejector apparatus according to the invention, may take the form of a linear electric actuator adapted for operative connection between the mother cart frame and the ejector arm for pivoting the ejector arm about the pivot point, such that in the extended position of the ejector arm the distal end of the ejector arm is brought to bear against and urge the daughter cart to move in the coupling system away from the towing position in the unloading direction.

In applications of a daughter cart ejector apparatus where the coupling system further includes a locking pin arrangement operatively attached to the mother cart and including a locking pin and a locking pin position selector, with the locking pin being selectively movable between a fully engaged position and a fully disengaged position, and adapted for engaging and locking the daughter cart in the towing position when in the fully engaged position of the locking pin while the daughter cart is positioned in the towing position, and with the locking pin position selector being operatively connected by the locking pin arrangement to the locking pin and selectively movable between pin-engaged and pin-disengaged positions thereof for positioning the locking pin in its fully engaged position when the locking pin position selector is located in its pin-engaged position and for positioning the locking pin in its fully disengaged position when the locking pin position selector is located in its pin-disengaged position, some forms of a control arrangement, according to the invention may be further configured for determining that the locking pin has been fully disengaged from the daughter cart and for delaying communication of the commence-eject signal to the ejector element actuator, and thereby precluding the ejector element from commencing movement from its retracted toward its extended positions, until full disengagement of the locking pin from the daughter cart has been detected.

In some forms of a daughter cart ejector apparatus, a control arrangement according to the invention may include a controller and a locking pin position sensor. The locking pin position sensor may be operatively coupled between the locking pin and the controller and configured for providing a locking pin position signal to the controller indicative of a present position of the locking pin. The controller may be configured for receiving the initiate-eject input, the locking pin position signal, and for generating the commence-eject signal. The controller may be operatively connected between the locking pin position sensor and the ejector element actuator. The controller may be configured for receiving the locking pin position signal from the locking pin position sensor, determining if the locking pin is fully disengaged, and if and only if the locking pin is fully disengaged generating and sending the commence-eject signal to the ejector element actuator.

In some forms of a daughter cart ejector apparatus, according to the invention, the locking pin arrangement and control arrangement may be configured such that the locking pin position selector is the initiate-eject input element, thus allowing utilization of the daughter cart ejector apparatus without the need for the operator manipulating any additional controls in comparison to what is typically required to release and decouple a daughter cart from a mother cart.

The invention may further be practiced in the form of a daughter cart ejector method, for aiding in ejecting a daughter cart of the wheels-on ground-type from a mother cart.

A daughter cart ejector method, according to the invention, may be practiced where the daughter cart has a daughter cart frame supported by casters attached to the daughter cart frame and configured for rolling engagement with an underlying surface during transport of the daughter cart on the underlying surface, the mother cart has a frame defining a transport direction and supported by wheels attached to the mother cart frame for rolling engagement with the underlying surface, and the mother cart also has a coupling system that is attached to the mother cart frame and adapted and oriented for operatively guiding the daughter cart in a loading direction that is substantially transverse to the transport direction into towable engagement in a towing position with the mother cart.

A daughter cart ejector method, according to the invention, may include: operatively attaching a daughter cart ejector element to the mother cart frame for movement of the ejector element between an extended position where the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction; and moving the daughter cart ejector element from its retracted to its extended position to thereby urge the daughter cart out of the towing position with respect to the mother cart.

Some forms of a method according to the invention may include providing an ejector element in the form of an ejector arm having a proximal end pivotably attached to the mother cart frame at a pivot point defined by the mother cart frame, and a distal end adapted for bearing against a daughter cart engaged with the coupling system of the mother cart and disposed in the towing position, and moving the ejector arm from its retracted to its extended position to urge the daughter cart out of the towing position with respect to the mother cart Practicing the invention as a daughter cart ejector method may include: operatively connecting an ejector element actuator between the mother cart frame and the ejector element, the ejector element actuator being configured for receiving a commence-eject signal and selectively moving the ejector element between the retracted and extended positions of the ejector element in response to the commence-eject signal; operatively attaching to the mother cart and the ejector element actuator, a control arrangement including a daughter cart initiate-eject input element configured for receiving an initiate-eject input indicating a desire to initiate ejection of the daughter cart from the mother cart, the control arrangement being configured for generating the commence-eject signal to the ejector actuator in response to the initiate-eject signal, for causing the ejector element actuator to move the ejector element from the retracted toward the extended positions of the ejector element; and initiating movement of the daughter cart ejector element from its retracted to its extended position with respect to the mother cart by actuating the initiate-eject input element.

In forms of the invention where the control arrangement includes a controller and a locking pin position sensor, with the locking pin position sensor operatively coupled between the locking pin and the controller and configured for providing a locking pin position signal to the controller indicative of a present position of the locking pin, and the controller configured for receiving the initiate-eject input, the locking pin position signal, and for generating the commence-eject signal, the controller operatively connected between the locking pin position sensor and the ejector element actuator, and where the controller is configured for receiving the locking pin position signal from the locking pin position sensor, determining if the locking pin is fully disengaged, and if and only if the locking pin is fully disengaged generating and sending the commence-eject signal to the ejector element actuator, some forms of a method, according to the invention, may further include, receiving the locking pin position signal from the locking pin position sensor at the controller, determining if the locking pin is fully disengaged, and if and only if the locking pin is fully disengaged, generating and sending the commence-eject signal to the ejector element actuator.

Some forms of a daughter cart eject method, according to the invention, may include determining that the locking pin has been held in its fully disengaged position for a preselected period of time before sending the commence-eject signal to the ejector element actuator.

To simplify and facilitate operation, in some forms of the invention, the locking pin arrangement and control arrangement are configured such that the locking pin position selector is utilized to also simultaneously function as the initiate-eject input element, and a daughter cart eject method may include simultaneously initiating both retraction of the locking pin and ejection of the daughter cart by placing the locking pin position selector in its fully disengaged position.

These and other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 6 is an orthographic top, plan view of the mother cart of FIG. 1 showing the wheels-on-ground type daughter cart of FIGS. 3-5 secured in a towing position to the mother cart;

FIGS. 7-9 are sequential, schematic illustrations showing a top orthographic view of a wheels-on-ground type daughter cart being moved from the towing position within the mother cart, away from a mother cart in an unloading direction by an ejector arm of an exemplary embodiment of a daughter cart ejector apparatus, according to the invention;

Figure 1:
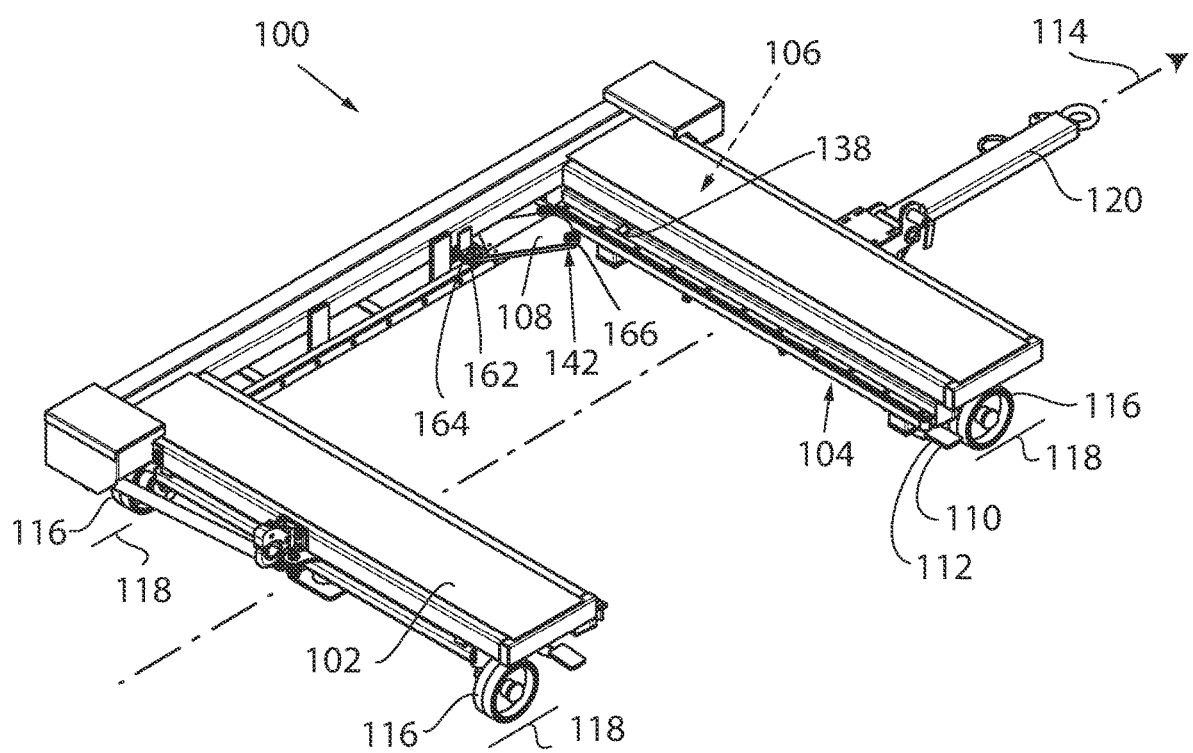
FIG. 1 is an isometric illustration of an exemplary embodiment of a mother cart, according to the invention, that includes a daughter cart ejector apparatus.

While the invention is described in connection with certain exemplary embodiments, there is no intent to limit the scope of the invention to those embodiments. On the contrary, the intent is to cover all alternatives, modifications and equivalents as included within the spirit and scope of the invention. To facilitate understanding of various aspects and embodiments of the invention, like features are selectively labeled with like reference numerals in some alternate embodiments of the invention.

DETAILED DESCRIPTION OF THE PREFERRED EMBODIMENTS

FIG. 1 shows an exemplary embodiment of a mother cart 100, according to the invention, including a mother cart frame 102, a coupling system 104, and a daughter cart ejector system 106, of which only an ejector element in the form of an ejector arm 108 and a foot-actuated daughter cart release peddle 110 which also serves as an initiate-eject input element 112 of the daughter cart ejector system 106 in the exemplary embodiment, are visible in FIG. 1. As further indicated in FIG. 1, the mother cart frame 102 defines a transport direction 114 and is supported by steerable wheels 116,116,116,116 attached to the mother cart frame 102 that provide rolling engagement with an underlying surface 118, as the mother cart 100 is towed over the underlying surface 118 in the transport direction 114 by a towing vehicle (not shown) attached to a towbar 120 of the mother cart 100.

Figure 2:
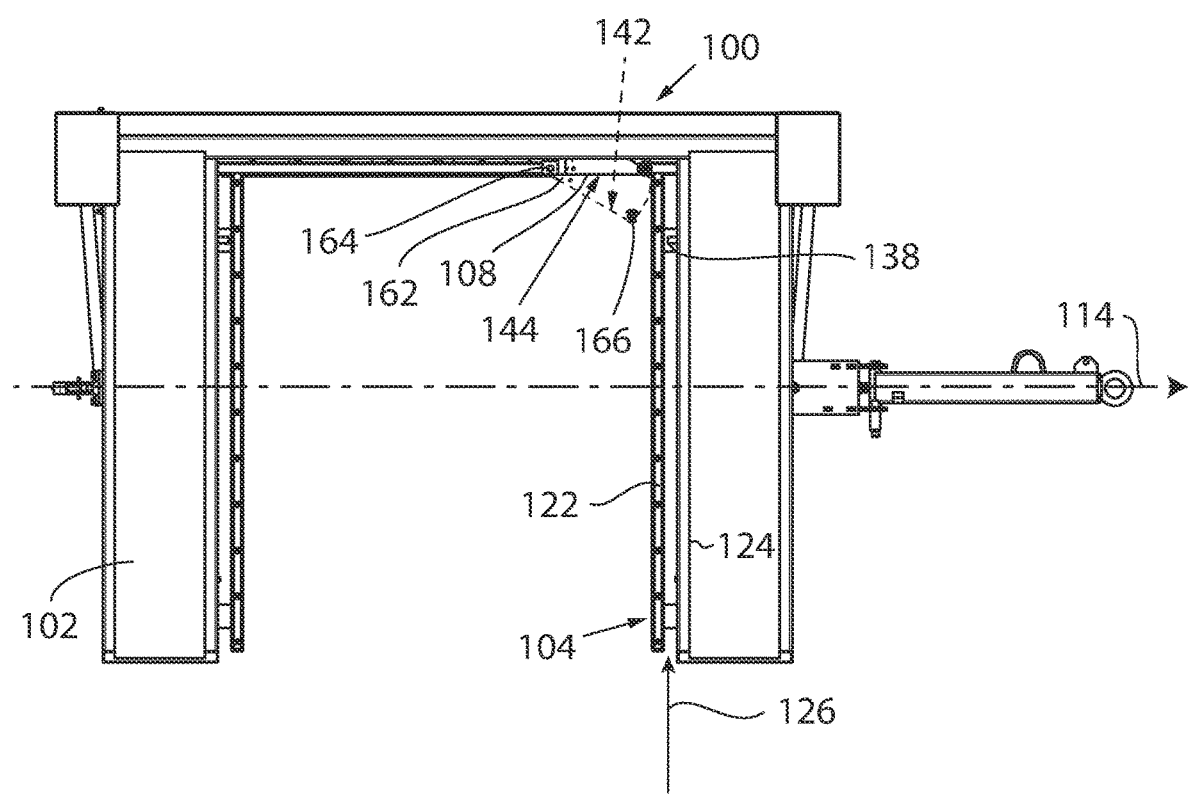
FIG. 2 is an orthographic top, plan view of the mother cart of FIG. 1.

As shown in FIG. 2, the coupling system 104 is attached to the mother cart frame 102, and includes a pair of spaced apart mother cart coupling rails 122,124 that are adapted and oriented for operatively guiding a daughter cart in a loading direction 126 that is substantially transverse to the transport direction 114 into towable engagement in a towing position with the mother cart 100, in a manner described in greater detail below.

FIGS. 3-6 illustrate a significant problem with unloading wheels-on-ground type daughter carts from mother carts, when the daughter carts are carrying heavy loads.

Specifically, FIGS. 3-6 illustrate a wheels-on-ground type daughter cart 128 carrying a heavy roll of paper 130, engaged with the exemplary embodiment of the mother cart 100. The daughter cart 128 has a daughter cart frame 132 supported by four casters 134,134,134,134 (only two of which are visible in FIGS. 3-5), attached to the daughter cart frame 132 and configured for rolling engagement with the underlying surface 118 during transport of the daughter cart 128 across the underlying surface 118.

Figure 3:
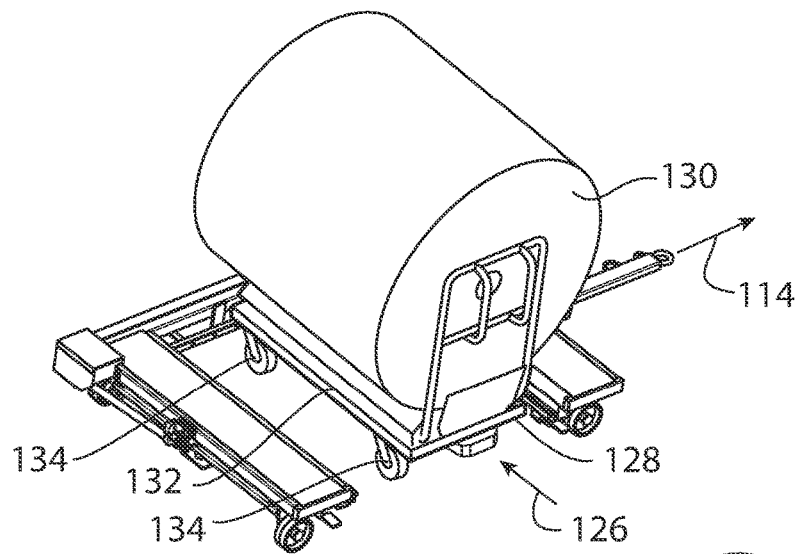
FIGS. 3-5 are isometric views of a wheels-on-ground type daughter cart coupled to the mother cart of FIG. 1, respectively illustrating the orientation of caster wheels on the daughter cart during loading the daughter cart into the mother cart, transport of the daughter cart by the mother cart, and unloading the daughter cart from the mother cart.

FIG. 3 shows the casters 134 oriented as they would be during loading of the daughter cart 128 into the mother cart. As shown in FIG. 3, the casters 134 of the daughter cart 128 swivel on their eccentric bases to align in a rolling direction parallel to the loading direction 126, as the daughter cart is pushed into the mother cart 100 toward a towing position 136 shown in FIGS. 4 and 6, and locked into the mother cart 100 with a locking pin 138 that can be seen in FIGS. 1 and 2. As the operator is maneuvering the daughter cart 128 to align it with the coupling system 104, because the daughter cart 128 is not yet engaged with and constrained by the coupling system 104 of the mother cart 100, the casters 134 can swivel relatively freely without requiring any significant additional force to accomplish any alignment of the casters in the loading direction 126 for guiding the loaded daughter cart 128 into engagement with the mother cart 100.

Figure 4:
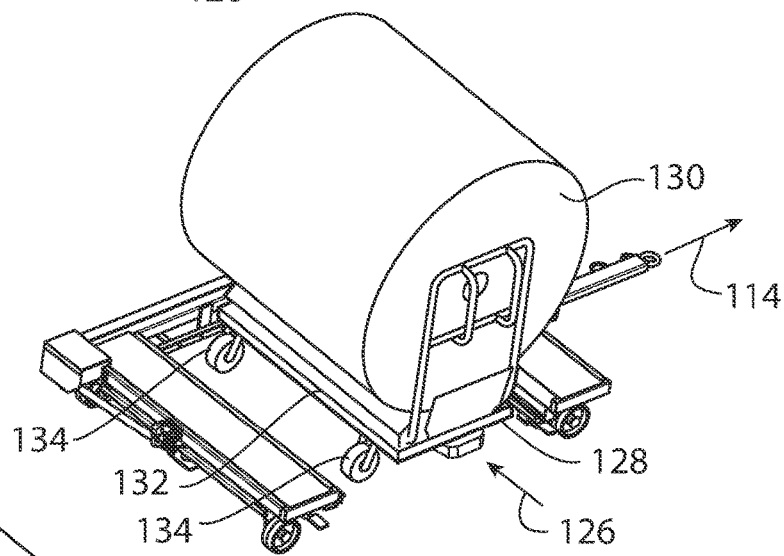

FIG. 4 shows the casters 134 oriented to roll in the transport direction 114. Once the daughter cart 128 is secured in the towing position 136 in the mother cart 100, as shown in FIG. 6, and the mother cart 100 begins to move in the transport direction 114, the casters 134 of the daughter cart 128 swivel on their eccentric bases, due to engagement with the underlying surface 118, to align in a rolling direction parallel to the transport direction 114, as shown in FIG. 4, as the daughter cart 128 is transported across the underlying surface 118 by the mother cart 100, as the mother cart 100 is towed along in the transport direction 114 by the towing vehicle. Although significant force is required at start-up after loading the daughter cart 128 into the mother cart 100 to swivel the casters 134 of the daughter cart 128 from their alignment after loading to their alignment for transport, the towing vehicle is easily capable of providing the momentary additional pulling force that is needed.

Figure 5:
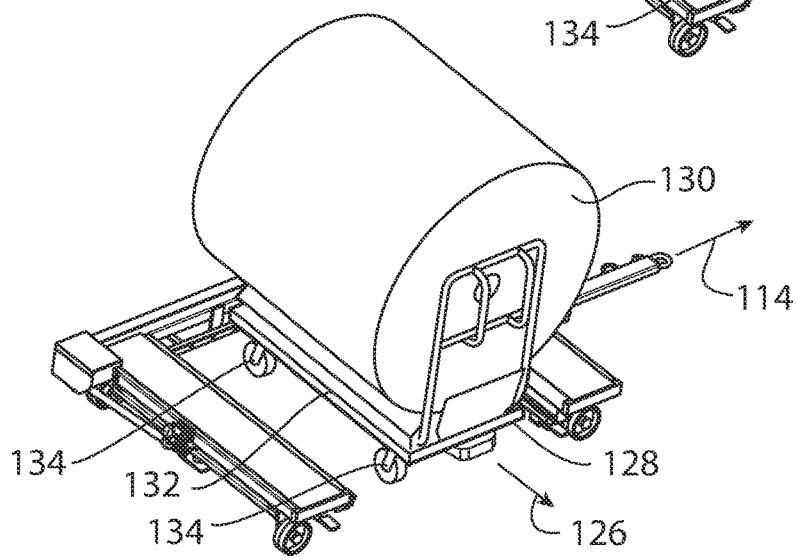

FIG. 5 shows the casters 134 oriented to roll in an unloading direction 140 that is substantially opposite from the loading position 126. This position of the casters is achieved after the mother cart 100 has delivered the daughter cart 128 to its destination, the locking pin 138 has been disengaged, and the daughter cart 128 has been pulled partly away from the transport position 136 a short distance in the unloading direction 140 while the daughter cart 128 is still engaged with the coupling system 104. In order to cause the wheels of the casters 134 to swivel to this position with the daughter cart 128 essentially still locked into the mother cart in the towing position 136, considerable swiveling force must be exerted in the unloading direction 140 in addition to the force required to start the heavily loaded daughter cart 128 moving in the unloading direction 140.

FIGS. 7-9 schematically illustrate the manner in which the invention addresses this problem with the daughter cart ejector apparatus 106 attached to the mother cart 100 for aiding the separation of the daughter cart 128 from the mother cart 100.

As mentioned above in reference to FIG. 1, the daughter cart ejector apparatus 106 includes an ejector element in the form of the ejector arm 108 that is operatively attached to the mother cart frame 102 and configured for movement between a fully extended position 142 of the ejector arm 108, as shown in FIGS. 1 and 2 whereat the ejector arm 108 operatively bears against the daughter cart frame 132 in a manner urging the daughter cart 128 to move away from the mother cart 100 in the unloading direction 140, and a fully retracted position 144 of the ejector arm 108, shown in FIG. 2, whereat the ejector arm 108 does not urge the daughter cart 128 to move away from the mother cart 100 in the coupling system 104 in the unloading direction 140.

In FIG. 7, the ejector arm 108 is in its fully retracted position 144, while the daughter cart 128 is located in the towing position 136.

In FIG. 8, the daughter cart ejector system 106 has begun to move the ejector arm 108 from its fully retracted position 144, toward its fully extended position 142, and is pushing the daughter cart 128 out of the towing position 136 away from the mother cart 100 in the coupling system 104 in the unloading direction 140. This motion of the daughter cart 128 in the unloading direction 140 causes the casters 134 of the daughter cart 128 to begin swiveling from the position shown in FIG. 4, aligned for rolling motion in the transport direction 114, toward alignment for rolling motion in the unloading direction 140 in the manner shown in FIG. 5.

FIG. 9 shows the eject arm 108 in its fully extended position 142, having moved the daughter cart 128 even farther along in the coupling system 104 in the unloading direction 140 and away from the mother cart 100. This further motion in the unloading direction 140 will cause the casters 134 of the daughter cart 128 to swivel even further into alignment for rolling motion in the unloading direction 140 in the manner shown in FIG. 5.

Those having skill in the art will recognize that by providing additional force for urging the daughter cart to move away from the mother cart 100 in the unloading direction and swiveling the casters 134 into alignment through action of the ejector arm 108 on the daughter cart 128 in the manner described above, a significant advantage is achieved by reducing the amount of effort that would otherwise be required of an operator to pull the heavily loaded wheels-on-ground mother cart 128 out of engagement with the mother cart 100.

As stated above in reference to FIG. 1 the coupling system 104 in the exemplary embodiment of the mother cart 100 includes a locking pin arrangement operatively attached to the mother cart 100 and including the locking pin 138 and a locking pin position selector, in the form of the daughter cart release peddle 110.

Figure 10:
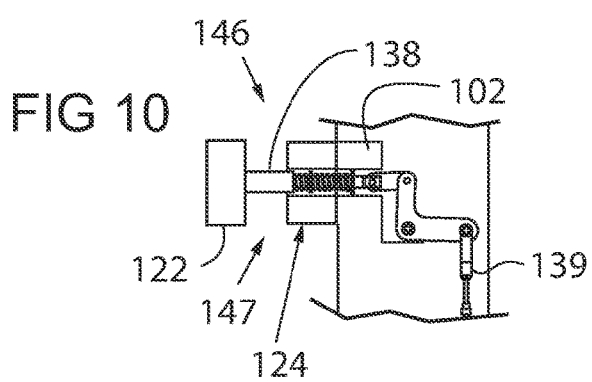
FIGS. 10 and 11 are partial sectional views of a portion of a mother cart coupling system of the exemplary embodiment of the mother cart of FIG. 1, respectively illustrating a spring-loaded daughter cart locking pin in fully engaged and fully disengaged positions of the locking pin.
Figure 11:
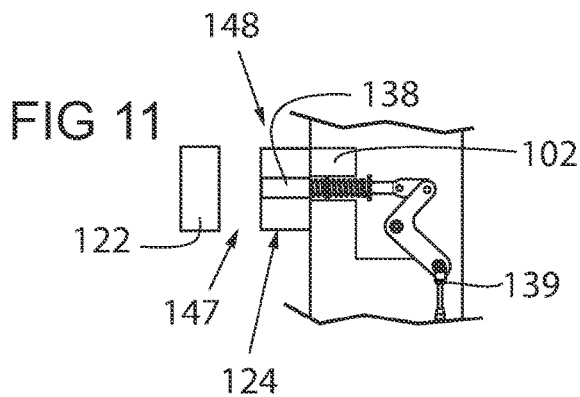

As illustrated in FIGS. 10-11, the locking pin 138 is selectively movable between a fully engaged position 146 shown in FIG. 10, extending across a channel 147 formed between the guide rails 122,124 of the coupling system 104 of the mother cart 100, and a fully disengaged position 148 shown in FIG. 11, where the locking pin 138 is retracted out of the channel 147 between the guide rails 122,124. The locking pin 138 is spring-loaded and biased toward its fully engaged position 146, and is adapted for engaging and locking the daughter cart 128 in the towing position 136 when the locking pin 138 is located in its fully engaged position 146 while the daughter cart 128 is positioned in the towing position 136.

Figure 12:
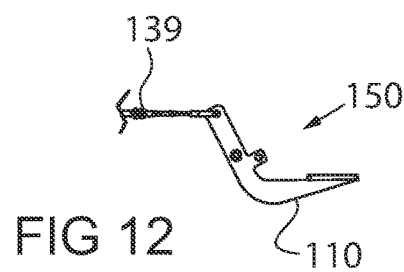
FIGS. 12 and 13 are partial views of a daughter cart release peddle of the exemplary embodiment of the mother cart of FIG. 1, from a point of view rotated 90 degrees from FIGS. 12 and 13 for clarity of illustration, respectively illustrating the release peddle in pin-engaged and pin-disengaged positions of the release peddle that correspond respectively to the fully engaged and fully disengaged positions of the locking pin shown in FIGS. 10 and 11.
Figure 13:
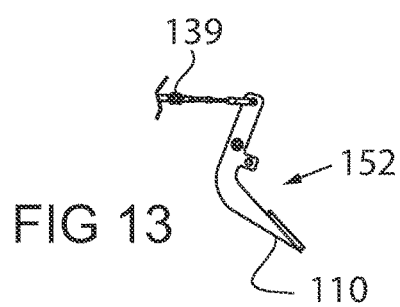
Figure 15:
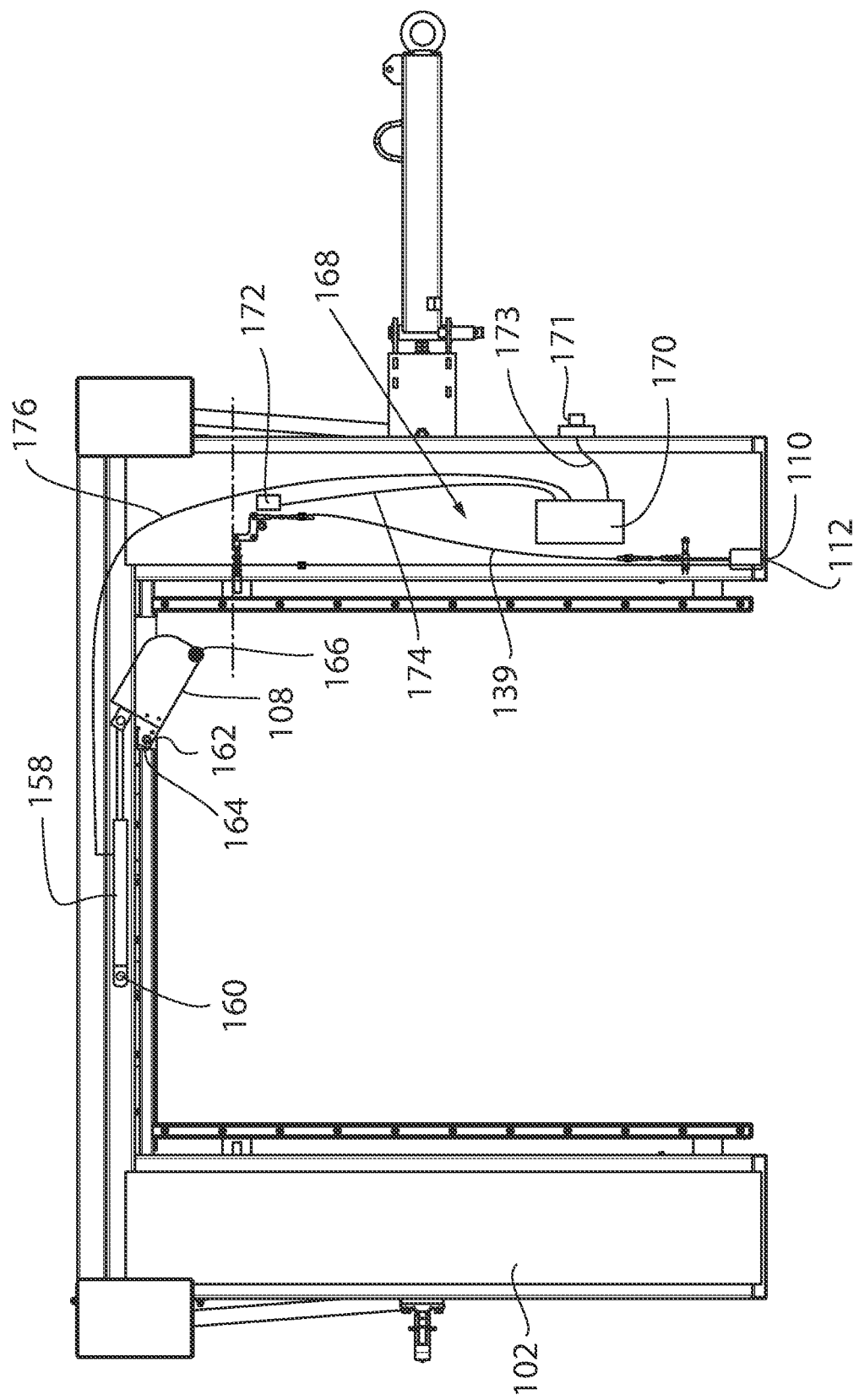
FIG. 15 is an orthographic sectional top view of the exemplary embodiment of the mother cart shown in FIGS. 1 and 2, illustrating elements and interconnection of elements of the exemplary embodiment daughter cart ejector apparatus, according to the invention.

As shown in FIGS. 12-13, and in FIG. 15, the daughter cart release peddle 110 is operatively connected via a locking pin actuation linkage 139, within the locking pin arrangement, to the locking pin 138. The daughter cart release peddle 110 is configured and operatively connected to be selectively movable between a pin-engaged position 150 shown in FIG. 12, and pin-disengaged position 152 shown in FIG. 13 of the daughter cart release peddle 110, for respectively positioning the locking pin 138 in its fully engaged position 146 when the daughter cart release peddle 110 is located in its pin-engaged position 150, and for positioning the locking pin 138 in its fully disengaged position 148 when the daughter cart release peddle 110 is located in its pin-disengaged position 152.

Figure 14:
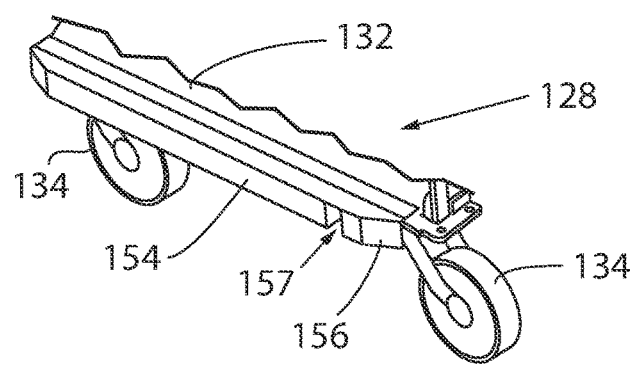
FIG. 14 is a partial isometric view of a portion of the wheels-on-ground daughter cart shown in FIGS. 3-6, showing a guide rail of the daughter cart configured for engagement with the coupling system of the exemplary embodiment of the mother cart shown in FIG. 1, and further illustrating a slot in the guide rail for receiving the locking pin shown in FIGS. 10 and 11.

As shown in FIG. 14, the daughter cart 128 shown in the exemplary embodiments herein has a coupling rail 154 that is attached to the daughter cart frame 132 and configured for sliding engagement in the channel 147 between the coupling rails 122,124 of the coupling system 104 of the mother cart 100, as the daughter cart 128 is guided in the loading direction 126 into the towing position 136 within the mother cart 100. The coupling rail 154 on the daughter cart 128 has a tapered end 156 which engages the locking pin 138 in the mother cart 100 during insertion of the daughter cart 128 into the mother cart 100. Because the locking pin 138 is spring loaded, the tapered end 156 of the coupling rail 154 on the daughter cart 128 temporarily pushes the locking pin 138 back into the mother cart 100 out of its normal fully engaged position 146. The coupling rail 154 on the daughter cart 128 also includes a cart-locking slot positioned in the coupling rail 154 for receiving the and engaging with the locking pin 138 in its fully engaged position 146, to lock the daughter cart 128 into the coupling system 104 of the mother cart 100 in the towing position 136. When the daughter cart 128 has been fully inserted into the coupling system 104 in the mother cart 100 at the towing position 136, the spring loaded locking pin 138 will snap back into its fully extended position 146 within the locking-pin slot 157 in the coupling rail 154 of the daughter cart 128, thereby locking the daughter cart 128 in the towing position 136 within the coupling system 104 of the mother cart 100.

As shown in FIG. 15, in addition to the ejector arm 108, the daughter cart ejector apparatus 106 of the exemplary embodiment of the mother cart 100 also includes an ejector element actuator, in the form of an ejector arm actuator 158, that is operatively connected between an ejector arm actuator lug 160 on the mother cart frame 102 and the ejector arm 108. The ejector arm actuator 158 is configured for selectively moving the ejector arm 108 between the retracted and extended positions 144,142 of the ejector arm 108.

As shown in FIGS. 1-2, and 15, a proximal end of the ejector arm 108 is pivotably attached to an ejector arm lug 162 of the mother cart frame 102, in a manner that provides a pivot point 164 for pivoting movement of the ejector arm 108 between its fully extended and fully retracted positions 142,144. The ejector arm actuator 158 in the exemplary embodiment of the mother cart 100 is a linear electric actuator operatively connected between the ejector arm actuator lug 160 of the mother cart frame 102 and the ejector arm 108, for pivoting the ejector arm 108 about the ejector arm pivot point 164, such that in the extended position 142 of the ejector arm 108 the distal end 166 of the ejector arm 108 can be brought to bear against, and urge the daughter cart 128 to move in the coupling system 104 away from the towing position 136 in the unloading direction 140, in the manner described above in relation to FIGS. 7-9.

As shown in FIG. 15, the daughter cart ejector apparatus 106 of the exemplary embodiment of the mother cart 100 also includes a control arrangement 168 operatively attached to the mother cart 100 and the ejector arm actuator 158. The control arrangement in the exemplary embodiment of mother cart 100 includes a daughter cart initiate-eject input element, in the form of the daughter cart release peddle 110, configured for receiving an initiate-eject input 112 when the peddle is depressed to indicating a desire to initiate ejection of the daughter cart 128 from the mother cart 100. The control arrangement 168 in the exemplary embodiment of the mother cart 100 is configured, in a manner described in more detail below, for generating a commence-eject signal to the ejector arm actuator 158 in response to the initiate-eject signal 112, for moving the ejector arm 108 from the retracted position 144 toward the extended position 142 of the ejector arm 108.

As previously described above with reference to FIGS. 10-13, the exemplary embodiment of the mother cart 100 includes a locking pin arrangement including a locking pin 138 and a locking pin position selector, in the form of the daughter cart release peddle 110, for securing the daughter cart 128 into engagement with the coupling system 104 of the mother cart 100 in the towing position 136 during transport of the daughter cart 128 by the mother cart 100. Although the invention could be practiced in forms where an operator seeking to remove the daughter cart 128 from the mother cart 100 might be required to initiate retraction of the locking pin 138 independently from and prior to activating the ejector arm 108, it is desirable in preferred embodiments of the invention to utilize a single point of control for both actions. Such a single point of control is desirable for simplifying unloading operations and demands on operators, and also to ensure that the locking pin 138 is fully disengaged before the ejector arm 108 begins urging the daughter cart 128 to move in the unloading direction 140.

Accordingly, the control arrangement 168 in the exemplary embodiment of the mother cart 100 is further configured for determining that the locking pin 138 has been fully disengaged from the daughter cart 128 and for delaying communication of the commence-eject signal to the ejector arm actuator 158, and thereby precluding the ejector arm 108 from commencing movement from its retracted toward its extended positions 144,142, until full disengagement of the locking pin 138 from the daughter cart 128 has been determined.

As shown in FIG. 15, the control arrangement 168 includes a controller 170 and a locking pin position sensor, in the form of a locking pin position detector switch 172. In the exemplary embodiment of the mother cart 100, electrical power for the daughter cart ejector apparatus 106 is supplied from the towing vehicle via an electrical connector 171 attached to the controller 170 by a cable 173, but in other embodiments of the invention electrical power for the daughter cart ejector apparatus 106 may be provided in other ways, such as by an on-board battery carried by the mother cart 100.

The locking pin position detector switch 172 is operatively attached and positioned adjacent to a component of the locking pin linkage 139 joining the daughter cart release peddle 110 to the locking pin 138. The pin position detector switch 172 is configured for determining when the locking pin 138 is positioned in its fully disengaged position 148, and is configured and connected to the controller 170 via an electrical cable 174 for providing a locking pin position signal to the controller 170 that is indicative of a present position of the locking pin 138. This locking pin position signal, which is indicative of a fully disengaged position 148 of the locking pin 138, is only generated by the locking pin position detector switch 172 when the daughter cart release peddle 110 is actuated and holding the locking pin 138 in its fully disengaged position 148, or when the surface guide rail 154 of the daughter cart 128 is holding the locking pin 138 in its fully disengaged position 148 after the operator releases the daughter cart release peddle 110, but the guide rail 154 is still engaged in the channel 147.

In the exemplary embodiment of the mother cart 100, a present position signal from the locking pin position detector switch 172 indicating that the locking pin 138 is being held in its fully disengaged position 148 by the daughter cart release peddle 110 also serves as an initiate-eject input electrical signal to the controller 170. The controller 170 is configured for receiving the initiate-eject input, which in the exemplary embodiment is also the locking pin position signal, and for generating and communicating a commence-eject signal over an electrical cable 176 to the eject arm actuator 158 to initiate the daughter cart ejection sequence discussed above with reference to FIGS. 7-9.

The controller 170 is configured for receiving the locking pin position signal from the locking pin position detector switch 172, determining if the locking pin 138 is fully disengaged, and if and only if the locking pin 138 is fully disengaged, generating and sending the commence-eject signal over cable 176 to the ejector arm actuator 158. In the exemplary embodiments described herein, the presence or absence of the locking pin position signal is determinative of whether the locking pin 138 is being held in its fully disengaged position 148. When practicing the invention in other embodiments, however, with locking pin position sensors of other types, for example, those having skill in the art will appreciate that the controller may be otherwise configured or include instructions stored on a non-transitory computer readable medium for determining if the locking pin 138 is fully disengaged, and if and only if the locking pin 138 is fully disengaged, generating and sending the commence-eject signal over cable 176 to the ejector arm actuator 158, or for performing any other logic or control functions described herein.

In the exemplary embodiment, the controller 170 is further configured for determining that the locking pin 138 has been held in its fully disengaged position 148 for a pre-selected period of time, such as two seconds for example, before sending the commence ejection signal to the ejector arm actuator 158, in order to ascertain that the operator is holding the daughter cart release peddle 110 in the actuated position rather than just momentarily depressing the peddle 110.

Those having skill in the art will appreciate that, due to the configuration of various elements of the exemplary embodiment, once the daughter cart eject apparatus 106 moves the daughter cart 128 a short distance in the coupling system 104, the slot 157 in the daughter cart guide rail 154 will have been moved out of alignment with the locking pin 138, and the operator can release the foot peddle 110. The locking pin spring will then cause the outer end of the locking pin 138 to ride along against the facing surface of the daughter cart guide rail 154, but the locking pin 138 will remain essentially in its fully disengaged position 148 as daughter cart 128 is further extracted from the mother cart 100. Because the locking pin 138 is still being held essentially in its fully disengaged position 148 by interaction of the outer end of the locking pin 138 sliding along the outer surface of the daughter cart guide rail 154, the controller 170 will continue to cause the eject arm actuator 158 to drive the eject arm 108 toward its fully extended position 142 even after the daughter cart release peddle 110 has been released.

Figure 16:
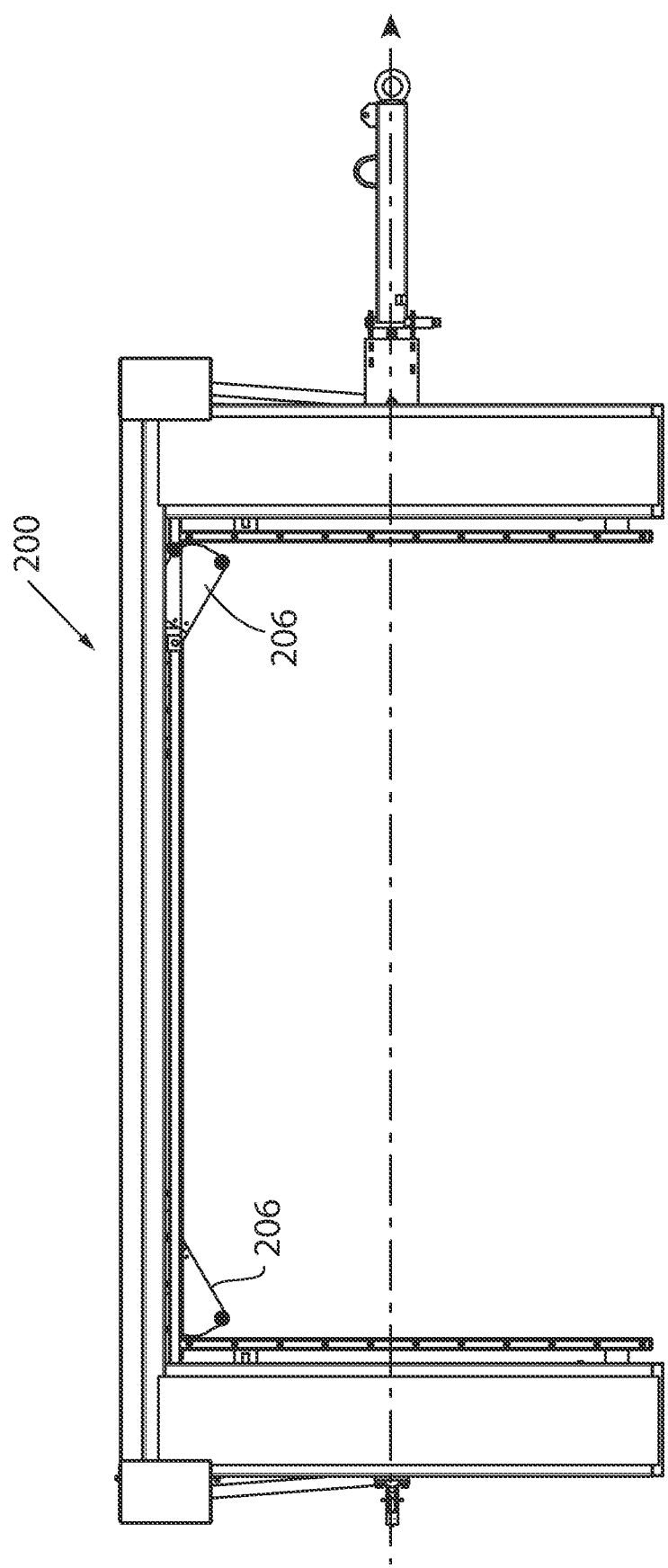
FIG. 16 is an orthographic top view of a second exemplary embodiment of a mother cart, according to the invention, which includes two daughter cart ejector apparatuses according to the invention.

It will also be appreciated, by those having skill in the art, that the exemplary embodiment of the mother cart 100 described herein included only one daughter cart ejector apparatus 106 according to the invention, it is contemplated that the invention may also be practiced with efficacy in arrangements having multiple daughter cart ejector apparatuses incorporated into a single mother cart, such as in the exemplary embodiment shown in FIG. 16 which includes two daughter cart ejector apparatuses 206,206 built into a single mother cart 200.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mother cart adapted for receiving, transporting, and ejecting, a daughter cart, of the wheels-on ground-type, where the daughter cart has a daughter cart frame supported by casters attached to the daughter cart frame and configured for rolling engagement with an underlying surface during transport of the daughter cart on the underlying surface, the mother cart comprising:
   a mother cart frame defining a transport direction and supported by wheels attached to the mother cart frame for rolling engagement with the underlying surface;
   a coupling system attached to the mother cart frame, and adapted and oriented for operatively guiding the daughter cart in a loading direction that is substantially transverse to the transport direction into towable engagement in a towing position with the mother cart; and
   a daughter cart ejector apparatus attached to the mother cart for aiding the separation of the daughter cart from the mother cart;
   the daughter cart ejector apparatus having an ejector element pivotably connected to the mother cart frame and configured for pivotable movement about an axis perpendicular to the transport direction between an extended position of the ejector element whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction.

2. The mother cart of claim 1, wherein the daughter cart ejector apparatus includes:
- an ejector element actuator operatively connected between the mother cart frame and the ejector element and configured for selectively moving the ejector element between the retracted and extended positions of the ejector element; and
- a control arrangement operatively attached to the mother cart and the ejector element actuator, the control arrangement including a daughter cart initiate-eject input element configured for receiving an initiate-eject input indicating a desire to initiate ejection of the daughter cart from the mother cart, the control arrangement being configured for generating a commence-eject signal to the ejector element actuator in response to the initiate-eject signal, for moving the ejector element from the retracted toward the extended positions of the ejector element.

3. A mother cart adapted for receiving, transporting, and ejecting, a daughter cart, of the wheels-on ground-type, where the daughter cart has a daughter cart frame supported by casters attached to the daughter cart frame and configured for rolling engagement with an underlying surface during transport of the daughter cart on the underlying surface, the mother cart comprising:
- a mother cart frame defining a transport direction and supported by wheels attached to the mother cart frame for rolling engagement with the underlying surface;
- a coupling system attached to the mother cart frame, and adapted and oriented for operatively guiding the daughter cart in a loading direction that is substantially transverse to the transport direction into towable engagement in a towing position with the mother cart; and
- a daughter cart ejector apparatus attached to the mother cart for aiding the separation of the daughter cart from the mother cart;
- the daughter cart ejector apparatus having an ejector element operatively attached to the mother cart frame and configured for movement between an extended position of the ejector element whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction;

wherein the daughter cart ejector apparatus includes:
- an ejector element actuator operatively connected between the mother cart frame and the ejector element and configured for selectively moving the ejector element between the retracted and extended positions of the ejector element; and
- a control arrangement operatively attached to the mother cart and the ejector element actuator, the control arrangement including a daughter cart initiate-eject input element configured for receiving an initiate-eject input indicating a desire to initiate ejection of the daughter cart from the mother cart, the control arrangement being configured for generating a commence-eject signal to the ejector element actuator in response to the initiate-eject signal, for moving the ejector element from the retracted toward the extended positions of the ejector element; and wherein:
- the ejector element is an ejector arm having a proximal end pivotably attached to the mother cart frame at a pivot point defined by the mother cart frame, and a distal end adapted for bearing against the daughter cart engaged with the coupling system of the mother cart and disposed in the towing position; and
- the ejector element actuator is a linear electric actuator operatively connected between the mother cart frame and the ejector arm for pivoting the ejector arm about the pivot point, such that in the extended position of the ejector arm the distal end of the ejector arm is brought to bear against and urge the daughter cart to move in the coupling system away from the towing position in the unloading direction.

4. A mother cart adapted for receiving, transporting, and ejecting, a daughter cart, of the wheels-on ground-type, where the daughter cart has a daughter cart frame supported by casters attached to the daughter cart frame and configured for rolling engagement with an underlying surface during transport of the daughter cart on the underlying surface, the mother cart comprising:
- a mother cart frame defining a transport direction and supported by wheels attached to the mother cart frame for rolling engagement with the underlying surface;
- a coupling system attached to the mother cart frame, and adapted and oriented for operatively guiding the daughter cart in a loading direction that is substantially transverse to the transport direction into towable engagement in a towing position with the mother cart; and
- a daughter cart ejector apparatus attached to the mother cart for aiding the separation of the daughter cart from the mother cart;
- the daughter cart ejector apparatus having an ejector element operatively attached to the mother cart frame and configured for movement between an extended position of the ejector element whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction;

wherein the daughter cart ejector apparatus includes:
- an ejector element actuator operatively connected between the mother cart frame and the ejector element and configured for selectively moving the ejector element between the retracted and extended positions of the ejector element; and
- a control arrangement operatively attached to the mother cart and the ejector element actuator, the control arrangement including a daughter cart initiate-eject input element configured for receiving an initiate-eject input indicating a desire to initiate ejection of the daughter cart from the mother cart, the control arrangement being configured for generating a commence-eject signal to the ejector element actuator in response to the initiate-eject signal, for moving the ejector element from the retracted toward the extended positions of the ejector element; and wherein:
the coupling system further includes a locking pin arrangement operatively attached to the mother cart and including a locking pin and a locking pin position selector, the locking pin being selectively movable between a fully engaged position and a fully disengaged position and adapted for engaging and locking the daughter cart in the towing position when in the fully engaged position of the locking pin while the daughter cart is positioned in the towing position, the locking pin position selector being operatively connected within the locking pin arrangement to the locking pin and selectively movable between pin-engaged and pin-disengaged positions thereof for positioning the locking pin in its fully engaged position when the locking pin position selector is located in its pin-engaged position and for positioning the locking pin in its fully disengaged position when the locking pin position selector is located in its pin-disengaged position;

the control arrangement is further configured for determining that the locking pin has been fully disengaged from the daughter cart and for delaying communication of the commence-eject signal to the ejector element actuator, and thereby precluding the ejector element from commencing movement from its retracted toward its extended positions, until full disengagement of the locking pin from the daughter cart has been determined;

the control arrangement includes a controller and a locking pin position sensor, the locking pin position sensor being operatively coupled between the locking pin and the controller and configured for providing a locking pin position signal to the controller indicative of a present position of the locking pin, the controller being configured for receiving the initiate-eject input, the locking pin position signal, and for generating the commence-eject signal;

the controller is operatively connected between the locking pin position sensor and the ejector element actuator; and the controller is configured for receiving the locking pin position signal from the locking pin position sensor, determining if the locking pin is fully disengaged, and if and only if the locking pin is fully disengaged generating and sending the commence-eject signal to the ejector element actuator.

5. The mother cart of claim 4, wherein the controller is further configured for determining that the locking pin has been held in its fully disengaged position for a pre-selected period of time before sending the commence ejection signal to the ejector element actuator.

6. The mother cart of claim 4, wherein the locking pin arrangement and control arrangement are configured such that the locking pin position selector is the initiate-eject input element.

7. A daughter cart ejector apparatus adapted for attachment to a mother cart that is configured for receiving, transporting, and ejecting, a daughter cart of the wheels-on ground-type, for aiding in separation of the daughter cart from the mother cart, where the daughter cart has a daughter cart frame supported by casters attached to the daughter cart frame and is configured for rolling engagement with an underlying surface during transport of the daughter cart on the underlying surface, where the mother cart is adapted for receiving the daughter cart ejector apparatus, has a mother cart frame defining a transport direction, the mother cart frame being supported by wheels attached to the mother cart frame for rolling engagement with the underlying surface and including a coupling system attached to the mother cart frame, the coupling system being adapted and oriented for operatively guiding the daughter cart in a loading direction that is substantially transverse to the transport direction into towable engagement in a towing position with the mother cart, the daughter cart ejector apparatus comprising:

an ejector element pivotably connected to the mother cart frame and configured for pivotable movement about an axis perpendicular to the transport direction between an extended position of the ejector element whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction;

an ejector element actuator adapted for operative connection between the mother cart frame and the ejector element and configured for selectively moving the ejector element between the retracted and extended positions of the ejector element; and a control arrangement adapted for operative attachment to the mother cart and the ejector element actuator, the control arrangement including a daughter cart initiate-eject input element configured for receiving an initiate-eject input indicating a desire to initiate ejection of the daughter cart from the mother cart, the control arrangement being configured for generating a commence-eject signal to the ejector actuator in response to the initiate-eject signal, for moving the ejector element from the retracted toward the extended positions of the ejector element.

8. A daughter cart ejector apparatus adapted for attachment to a mother cart that is configured for receiving, transporting, and ejecting, a daughter cart of the wheels-on ground-type, for aiding in separation of the daughter cart from a mother cart, where the daughter cart has a daughter cart frame supported by casters attached to the daughter cart frame and is configured for rolling engagement with an underlying surface during transport of the daughter cart on the underlying surface, where the mother cart is adapted for receiving the daughter cart ejector apparatus, has a mother cart frame defining a transport direction, the mother cart frame being supported by wheels attached to the mother cart frame for rolling engagement with the underlying surface and including a coupling system attached to the mother cart frame, the coupling system being adapted and oriented for operatively guiding the daughter cart in a loading direction that is substantially transverse to the transport direction into towable engagement in a towing position with the mother cart, the daughter cart ejector apparatus comprising:

an ejector element adapted for operative attachment to the mother cart frame and configured for movement between an extended position of the ejector element whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction;

an ejector element actuator adapted for operative connection between the mother cart frame and the ejector element and configured for selectively moving the ejector element between the retracted and extended positions of the ejector element; and a control arrangement adapted for operative attachment to the mother cart and the ejector element actuator, the control arrangement including a daughter cart initiate-eject input element configured for receiving an initiate-eject input indicating a desire to initiate ejection of the daughter cart from the mother cart, the control arrangement being configured for generating a commence-eject signal to the ejector actuator in response to the initiate-eject signal, for moving the ejector element from the retracted toward the extended positions of the ejector element;

wherein:

the ejector element is an ejector arm having a proximal end adapted for pivotable attachment to the mother cart frame at a pivot point defined by the mother cart frame, and a distal end adapted for bearing against the daughter cart engaged with the coupling system of the mother cart and disposed in the towing position; and the ejector actuator is a linear electric actuator adapted for operative connection between the mother cart frame and the ejector arm for pivoting the ejector arm about the pivot point, such that in the extended position of the ejector arm the distal end of the ejector arm is brought to bear against and urge the daughter cart to move in the coupling system away from the towing position in the unloading direction.

9. A daughter cart ejector apparatus adapted for attachment to a mother cart that is configured for receiving, transporting, and ejecting, a daughter cart of the wheels-on ground-type, for aiding in separation of the daughter cart from a mother cart, where the daughter cart has a daughter cart frame supported by casters attached to the daughter cart frame and is configured for rolling engagement with an underlying surface during transport of the daughter cart on the underlying surface, where the mother cart is adapted for receiving the daughter cart ejector apparatus, has a mother cart frame defining a transport direction, the mother cart frame being supported by wheels attached to the mother cart frame for rolling engagement with the underlying surface and including a coupling system attached to the mother cart frame, the coupling system being adapted and oriented for operatively guiding the daughter cart in a loading direction that is substantially transverse to the transport direction into towable engagement in a towing position with the mother cart, the daughter cart ejector apparatus comprising:

an ejector element adapted for operative attachment to the mother cart frame and configured for movement between an extended position of the ejector element whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction;

an ejector element actuator adapted for operative connection between the mother cart frame and the ejector element and configured for selectively moving the ejector element between the retracted and extended positions of the ejector element; and a control arrangement adapted for operative attachment to the mother cart and the ejector element actuator, the control arrangement including a daughter cart initiate-eject input element configured for receiving an initiate-eject input indicating a desire to initiate ejection of the daughter cart from the mother cart, the control arrangement being configured for generating a commence-eject signal to the ejector actuator in response to the initiate-eject signal, for moving the ejector element from the retracted toward the extended positions of the ejector element;

wherein:

the coupling system further includes a locking pin arrangement operatively attached to the mother cart and including a locking pin and a locking pin position selector, the locking pin being selectively movable between a fully engaged position and a fully disengaged position thereof and adapted for engaging and locking the daughter cart in the towing position when in the fully engaged position of the locking pin while the daughter cart is positioned in the towing position, the locking pin position selector being operatively connected by the locking pin arrangement to the locking pin and selectively movable between pin-engaged and pin-disengaged positions thereof for positioning the locking pin in its fully engaged position when the locking pin position selector is located in its pin-engaged position and for positioning the locking pin in its fully disengaged position when the locking pin position selector is located in its pin-disengaged position;

the control arrangement is further configured for determining that the locking pin has been fully disengaged from the daughter cart and for delaying communication of the commence-eject signal to the ejector element actuator, and thereby precluding the ejector element from commencing movement from its retracted toward its extended positions, until full disengagement of the locking pin from the daughter cart has been determined;

the control arrangement includes a controller and a locking pin position sensor, the locking pin position sensor being operatively coupled between the locking pin and the controller and configured for providing a locking pin position signal to the controller indicative of a present position of the locking pin, the controller being configured for receiving the initiate-eject input, the locking pin position signal, and for generating the commence-eject signal;

the controller is operatively connected between the locking pin position sensor and the ejector element actuator; and the controller is configured for receiving the locking pin position signal from the locking pin position sensor, determining if the locking pin is fully disengaged, and if and only if the locking pin is fully disengaged generating and sending the commence-eject signal to the ejector element actuator.

10. The daughter cart ejector apparatus of claim 9, wherein the controller is further configured for determining that the locking pin has been held in its fully disengaged position for a pre-selected period of time before sending the commence ejection signal to the ejector element actuator.

11. The daughter cart ejector apparatus of claim 9, wherein the locking pin arrangement and control arrangement are configured such that the locking pin position selector is the initiate-eject input element.

12. A daughter cart ejector method for aiding in ejecting a daughter cart of the wheels-on ground-type from a mother cart, where the daughter cart has a daughter cart frame supported by casters attached to the daughter cart frame and configured for rolling engagement with an underlying surface during transport of the daughter cart on the underlying surface, the mother cart has a frame defining a transport direction and supported by wheels attached to the mother cart frame for rolling engagement with the underlying surface, and the mother cart also has a coupling system that is attached to the mother cart frame and adapted and oriented for operatively guiding the daughter cart in a loading direction that is substantially transverse to the transport direction into towable engagement in a towing position with the mother cart, the daughter cart ejector method comprising:

pivotably connecting a daughter cart ejector element to the mother cart frame for pivotable movement of the ejector element about an axis perpendicular to the transport direction between an extended position whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction; and moving the daughter cart ejector element from its retracted to its extended position to urge the daughter cart out of the towing position with respect to the mother cart.

13. A daughter cart ejector method for aiding in ejecting a daughter cart of the wheels-on ground-type from a mother cart, where the daughter cart has a daughter cart frame supported by casters attached to the daughter cart frame and configured for rolling engagement with an underlying surface during transport of the daughter cart on the underlying surface, the mother cart has a frame defining a transport direction and supported by wheels attached to the mother cart frame for rolling engagement with the underlying surface, and the mother cart also has a coupling system that is attached to the mother cart frame and adapted and oriented for operatively guiding the daughter cart in a loading direction that is substantially transverse to the transport direction into towable engagement in a towing position with the mother cart, the daughter cart ejector method comprising:

operatively attaching a daughter cart ejector element to the mother cart frame for movement of the ejector element between an extended position whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction; and moving the daughter cart ejector element from its retracted to its extended position to urge the daughter cart out of the towing position with respect to the mother cart;

wherein:

the ejector element is an ejector arm having a proximal end pivotably attached to the mother cart frame at a pivot point defined by the mother cart frame, and a distal end adapted for bearing against a daughter cart engaged with the coupling system of the mother cart and disposed in the towing position; and the method includes moving the ejector arm from its retracted to its extended position to urge the daughter cart out of the towing position with respect to the mother cart.

14. The daughter cart ejector method of claim 12, further comprising:

operatively connecting an ejector element actuator between the mother cart frame and the ejector element, the ejector element actuator being configured for receiving a commence-eject signal and selectively moving the ejector element between the retracted and extended positions of the ejector element in response to the commence-eject signal;

operatively attaching to the mother cart and the ejector element actuator, a control arrangement including a daughter cart initiate-eject input element configured for receiving an initiate-eject input indicating a desire to initiate ejection of the daughter cart from the mother cart, the control arrangement being configured for generating the commence-eject signal to the ejector actuator in response to the initiate-eject input, for causing the ejector element actuator to move the ejector element from the retracted toward the extended positions of the ejector element; and initiating movement of the daughter cart ejector element from its retracted to its extended position with respect to the mother cart by actuating the initiate-eject input element.

15. A daughter cart ejector method for aiding in ejecting a daughter cart of the wheels-on ground-type from a mother cart, where the daughter cart has a daughter cart frame supported by casters attached to the daughter cart frame and configured for rolling engagement with an underlying surface during transport of the daughter cart on the underlying surface, the mother cart has a frame defining a transport direction and supported by wheels attached to the mother cart frame for rolling engagement with the underlying surface, and the mother cart also has a coupling system that is attached to the mother cart frame and adapted and oriented for operatively guiding the daughter cart in a loading direction that is substantially transverse to the transport direction into towable engagement in a towing position with the mother cart, the daughter cart ejector method comprising:

operatively attaching a daughter cart ejector element to the mother cart frame for movement of the ejector element between an extended position whereat the ejector element operatively bears against the daughter cart frame in a manner urging the daughter cart to move away from the mother cart in an unloading direction that is substantially opposite from the loading direction, and a retracted position of the ejector element whereat the ejector element does not urge the daughter cart to move away from the mother cart in the coupling system in the unloading direction;

moving the daughter cart ejector element from its retracted to its extended position to urge the daughter cart out of the towing position with respect to the mother cart; operatively connecting an ejector element actuator between the mother cart frame and the ejector element, the ejector element actuator being configured for receiving a commence-eject signal and selectively moving the ejector element between the retracted and extended positions of the ejector element in response to the commence-eject signal;

operatively attaching to the mother cart and the ejector element actuator, a control arrangement including a daughter cart initiate-eject input element configured for receiving an initiate-eject input indicating a desire to initiate ejection of the daughter cart from the mother cart, the control arrangement being configured for generating the commence-eject signal to the ejector actuator in response to the initiate-eject input, for causing the ejector element actuator to move the ejector element from the retracted toward the extended positions of the ejector element; and initiating movement of the daughter cart ejector element from its retracted to its extended position with respect to the mother cart by actuating the initiate-eject input element; wherein:

the coupling system includes a locking pin arrangement operatively attached to the mother cart and including a locking pin and a locking pin position selector, the locking pin being selectively movable between a fully engaged position and a fully disengaged position and adapted for engaging and locking the daughter cart in the towing position when in the fully engaged position of the locking pin while the daughter cart is positioned in the towing position, the locking pin position selector being operatively connected by the locking pin arrangement to the locking pin and selectively movable between pin-engaged and pin-disengaged positions thereof for positioning the locking pin in its fully engaged position when the locking pin position selector is located in its pin-engaged position and for positioning the locking pin in its fully disengaged position when the locking pin position selector is located in its pin-disengaged position;

the control arrangement is further configured for determining that the locking pin has been fully disengaged from the daughter cart and for delaying communication of the commence-eject signal to the ejector element actuator, and thereby precluding the ejector element from commencing movement from its retracted toward its extended positions, until full disengagement of the locking pin from the daughter cart has been determined;

the method further includes, determining that the locking pin has been fully disengaged from the daughter cart and delaying communication of the commence-eject signal to the ejector element actuator, to thereby preclude the ejector element from commencing movement from its retracted toward its extended positions until full disengagement of the locking pin from the daughter cart has been determined;

the control arrangement includes a controller and a locking pin position sensor, the locking pin position sensor being operatively coupled between the locking pin and the controller and configured for providing a locking pin position signal to the controller indicative of a present position of the locking pin, the controller being configured for receiving the initiate-eject input, the locking pin position signal, and for generating the commence-eject signal;

the controller being operatively connected between the locking pin position sensor and the ejector element actuator;

the controller being configured for receiving the locking pin position signal from the locking pin position sensor, determining if the locking pin is fully disengaged, and if and only if the locking pin is fully disengaged generating and sending the commence-eject signal to the ejector element actuator; and the method further includes, receiving the locking pin position signal from the locking pin position sensor at the controller, determining if the locking pin is fully disengaged, and if and only if the locking pin is fully disengaged, generating and sending the commence-eject signal to the ejector element actuator.

16. The daughter cart ejection method of claim 15, further comprising:

determining that the locking pin has been held in its fully disengaged position for a pre-selected period of time before sending the commence-eject signal to the ejector element actuator.

17. The daughter cart ejection method of claim 16, wherein:

the locking pin arrangement and control arrangement are configured such that the locking pin position selector is the initiate-eject input element; and the method includes simultaneously initiating both retraction of the locking pin and ejection of the daughter cart by placing the locking pin position selector in its fully disengaged position.

\* \* \* \* \*